J. A. BROWNING.
BEET HARVESTER.
APPLICATION FILED AUG. 19, 1913.
1,095,802.
Patented May 5, 1914.
4 SHEETS—SHEET 1.
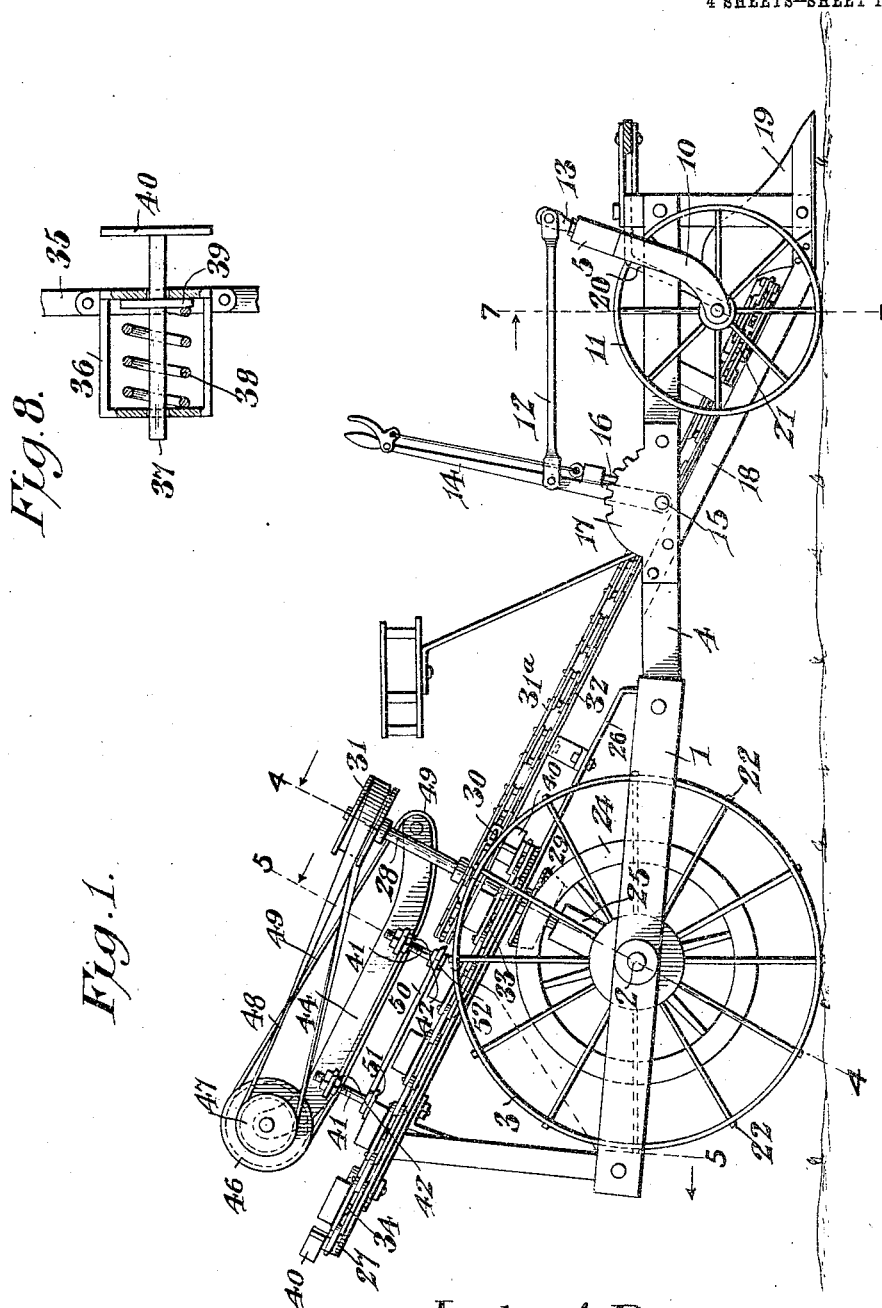
Justus A. Browning, INVENTOR
WITNESSES
BY
ATTORNEY J. A. BROWNING.
BEET HARVESTER.
APPLICATION FILED AUG. 19, 1913.
1,095,802.
Patented May 5, 1914.
4 SHEETS—SHEET 2.
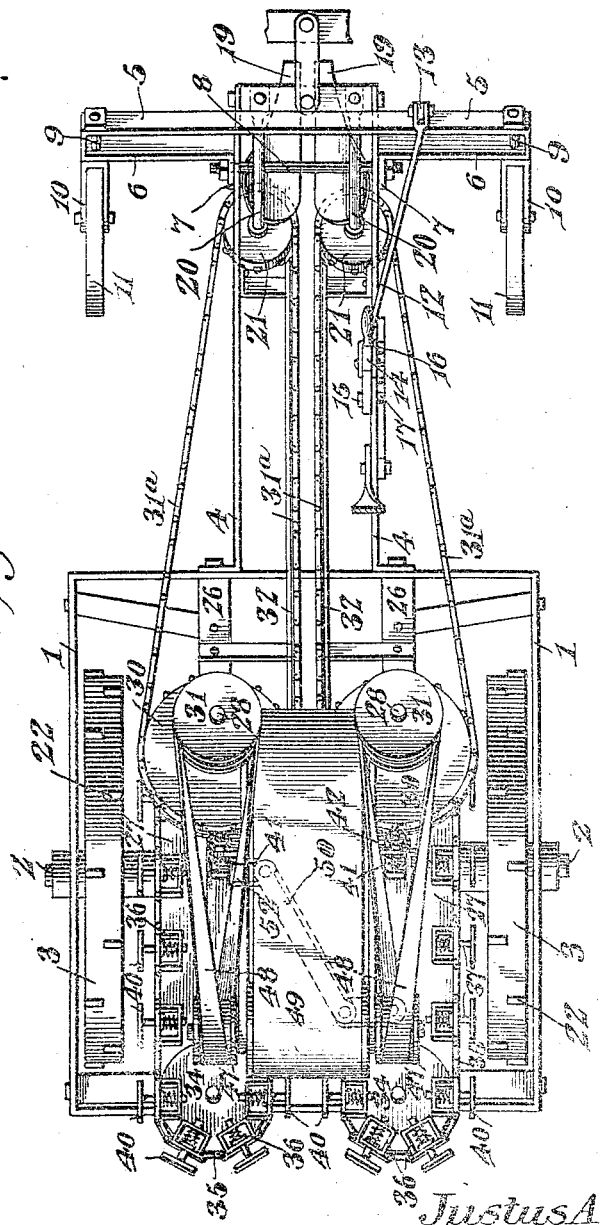
WITNESSES
Jas. K. McLathran
F. T. Chapman
Justus A. Browning, INVENTOR
BY
ATTORNEY J. A. BROWNING.
BEET HARVESTER.
APPLICATION FILED AUG. 19, 13.
1,095,802.
Patented May 5, 1914.
4 SHEETS—SHEET 3.
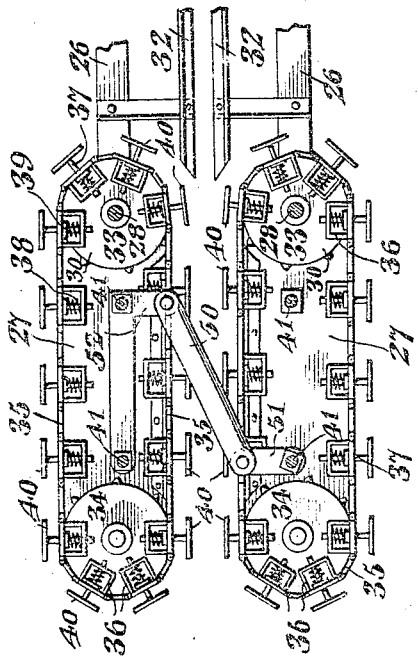
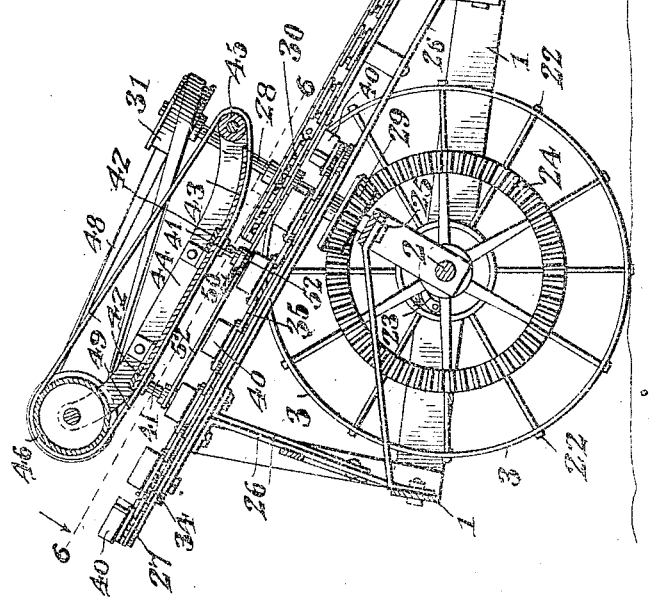
WITNESSES
Jas. K. McLachlan
F. T. Chapman.
Justus A. Browning, INVENTOR
BY
C. G. Siggers
ATTORNEY

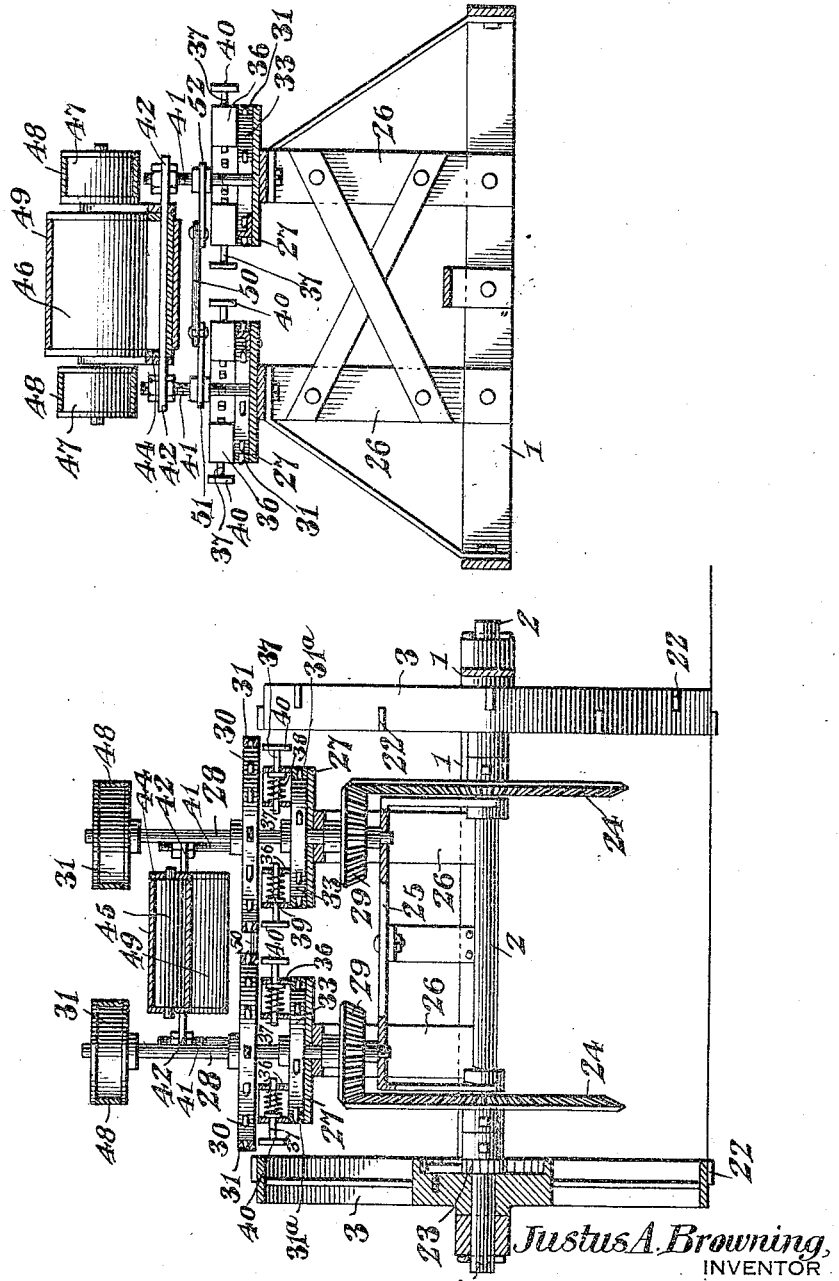

UNITED STATES PATENT OFFICE.

JUSTUS A. BROWNING, OF OGDEN, UTAH, ASSIGNOR OF ONE-FOURTH TO AMIEL SCHERRER, OF OGDEN, UTAH.

BEET-HARVESTER.

1,095,802.	Specification of Letters Patent.	Patented May 5, 1914.

Application filed August 19, 1913. Serial No. 785,519.

*To all whom it may concern:*

Be it known that I, JUSTUS A. BROWNING, a citizen of the United States, residing at Ogden, in the county of Weber and State of Utah, have invented a new and useful Beet-Harvester, of which the following is a specification.

This invention has reference to improvements in beet harvesters, and its object is to produce a harvester which will remove the beets from the ground and subsequently top the beets all in one continuous operation.

In accordance with the present invention there is provided a machine which may be drawn over a field of beets by draft animals or in any other manner, and mounted on the vehicle is an elevating conveyer composed of two adjacent members between which the beets, extracted from the ground by suitable means, such as plows, are received and carried to an appropriate height and at such point the bodies of the beets are grasped between other movable members and simultaneously leveled with respect to the grasping means so that they will project at substantially the same distance therefrom, and then the beets while being carried along by the grasping means are moved against a cutting member which acts to sever the tops of the beets from the bodies thereof, the whole structure being particularly adapted for harvesting of sugar beets.

The invention will be best understood from a consideration of the following detailed description, taken in connection with the acompanying drawings forming a part of this specification, with the further understanding that while the drawings show a practical form of the invention, the latter is not confined to any strict conformity with the showing of the drawings but may be changed and modified so long as such changes and modifications mark no material departure from the salient features of the invention.

In the drawings:—Figure 1 is a side elevation of a harvester constructed in accordance with the present invention and showing the parts in the inactive position. Fig. 2 is a plan view of the structure shown in Fig. 1. Fig. 3 is a longitudinal vertical central section through the machine of Fig. 1 but showing the parts in the active position. Fig. 4 is a section on the line 4—4 of Fig. 1. Fig. 5 is a section on the line 5—5 of Fig. 1 with some parts omitted. Fig. 6 is a section on the line 6—6 of Fig. 3 with parts omitted. Fig. 7 is a section on the line 7—7 of Fig. 1. Fig. 8 is a detail section showing the structure of one of the beet clamping members.

Referring to the drawings there is shown a main frame 1 in which is mounted an axle 2, said main frame being sufficiently extensive to permit the mounting of sustaining wheels 3 within the confines of the frame. There is also provided a forward extension 4 of the main frame which may be narrower than said main frame and at the front carries a cross beam 5 of greater width than the extension 4. This cross beam 5 has its ends returned upon themselves, as indicated at 6, and each return portion 6 terminates in an ear 7 connected to the frame extension 4 by a pivot bolt 8, so that the beam 5 may be rocked upon the pivot bolt 8 as an axis. Mounted in each outer end of the beam 5 is a stem or pintle 9 terminating below the beam in a fork 10 carrying a caster wheel 11, the stem 9 acting as a pivot for the caster wheel. The beam 5 is controlled by a link 12 connected at one end to a stud 13 upstanding from the beam and at the other end to a latch lever 14 pivoted at 15 to the frame 4 and provided with a hand latch 16 in operative relation to a rack segment 17 attached to the frame 4. By means of the structure just described the beam 5 may be rocked on its pivot 8 and the caster wheels 11 be thereby moved toward and from the frame 4, thus causing the dropping or lifting of the frame with respect to the ground.

Secured to opposite sides of the frame 4 are depending frames 18 each of which carries a plow 19, the plows being spaced apart in a manner to move on opposite sides of beets in the ground and a suitable distance below the surface of the ground when the machine is in operation to lift the beets, the plows throwing the dirt disturbed by them toward the center line of travel. Mounted in the forward portion of the frame 4 and the depending frames 18 are shafts 20 each arranged on a forward slant and near the lower end of each shaft 20 there is mounted a sprocket wheel 21.

Each main wheel 3 is provided with ribs 22 on its periphery after the custom of traction wheels, and is connected to the shaft 2 through the intermediary of a pawl and ratchet member 23 which may follow the practice of mowing machines and the like, the object being to drive the shaft 2 by the wheels 3 but admit of the turning of corners without bringing any strain upon the parts. Adjacent to each wheel 3 there is a bevel gear wheel 24 made fast to the axle or shaft 2, and between these wheels there is a frame 25 in part supported by the axle and in part supported by the frame 1. Also, carried by the frame 1 are two frames 26 arranged at a slant so as to be higher at the rear end of the machine than at the forward end, and these frames 26 are spaced above the frame 25. These frames 26 carry plates or tables 27 longitudinal of the machine and extending through each plate 27 and frame 26 is a shaft 28, the lower end of which is stepped into the frame 25 and between the frames 25 and 26 carries a bevel pinion 29 in mesh with the respective bevel gear 24, the arrangement being such that the shafts 28 are driven in opposite directions by the bevel gears 24 both turning in the same direction with the axle 2.

Each shaft 28 carries a sprocket wheel 30 above the respective frame 26 and at a higher point each shaft 28 carries a drum or pulley 31. Each sprocket wheel 30 is in line with a respective sprocket wheel or pinion 21 and encircling the sprocket wheels and extending between them is an endless sprocket chain 31ª, the arrangement being such that the adjacent runs of the two sprocket chains are quite close together and sufficiently close to hold beets between them after the beets have been raised from the ground. In order to maintain the adjacent runs of the sprocket chain from spreading, they are lodged in angle strips 32 which further sustain these chains, since their adjacent runs which move upwardly in the operation of the machine travel on the lower webs of the angle strips 32, which lower webs are directed one toward the other, while the other webs of the angle strips are upright, thus preventing the chain runs from spreading apart. Each shaft 28 also carries a sprocket wheel 33 immediately above the corresponding end of a respective plate 27, while a similar sprocket wheel 34 is mounted on the other end of the respective plate 27. Encircling each pair of sprocket wheels 33, 34 on the respective plate 27 are endless chains 35 driven by the rotative movement of the respective shafts 28. These sprocket chains carry spaced frames 36 each of which is traversed by a rod 37 which may be squared or otherwise shaped to prevent turning and within the frame each bar is surrounded by a spring 38 bearing at one end against that end of the frame remote from the sprocket chain, and at the other end against a head 39 fast on the bar within the frame. The bar 37 is long enough to project beyond the sprocket chain side of the frame and terminates in a head 40, the arrangement being such that the heads 40 of one chain face those of the other chain on the adjacent runs of the two chains, and, moreover, the chains are so spaced apart that the respective heads 40 are normally separated by a space less than the minimum thickness of a beet body.

Rising from the plates 27 are posts 41 in turn carrying a plate 42 in overlying relation to the matching portions of the runs of the chain 35, this plate having an upturned end 43 toward the front of the machine. Moreover, at the sides of the plate are bars 44 extending lengthwise of the machine. Between the front ends of these bars there is journaled a roller 45 and between the rear ends of the bars there is journaled another roller 46, and the journal of the roller 46 extends through and beyond both bars 44 and there carries pulleys 47 each of which is connected by a belt 48 to a respective pulley 31. Moreover, the pulleys 45 and 46 are encircled by a flexible band 49 traveling over that face of the plate 42 presented toward the sprocket chains 35 with their heads 40, these latter members, namely the heads 40, constituting gripping and clamping means for beets, as will hereinafter appear.

When the machine is in operative position the frame 4 is lowered toward the ground by a suitable manipulation of the lever 14 permitting the frame to approach the caster wheel journals. This causes the plows 19 to enter the ground to an appropriate distance, and as the machine is drawn over the ground the plows loosen the dirt about the beets and raise the latter until the bodies of the beets rest between the adjacent runs of the chains 31ª, the plowed-up dirt falling through the chains, and these runs of the chains then rising toward the rear portion of the machine carry the beets until ultimately the bodies of the beets are brought between approaching heads 40, the adjacent runs of which travel rearwardly with respect to the machine. The chains 31ª have a greater linear speed than the heads 40 because the sprocket wheels 30 are of greater diameter than the sprocket wheels 33 and the active runs of the chains 31ª end adjacent to the intake ends of the active runs of the series of heads 40, so that the latter may be closer together than the beets as planted because the chains 31ª travel faster than the heads 40. Also the chains 31ª and 35 have the same general inclination, while the chains 35 and heads 40 are at a lower level than the chains 31ª where the latter overlap the intake end of the chains 35. As the chains 31ª release the beets the heads 40, the matching ones of which are normally closer together than the thickness of a beet body, are forced apart against the tendency of the springs 38 and therefore clamp or grasp the beets. At the same time the tops of the beets being engaged by the traveling band or web 49 moving in the same direction as the beets, are all forced to approximately the same relation to the heads 40. At this point the bodies of the beets are brought against a knife blade 50 carried by arms 51, 52 extending from respective front and rear posts 41 on opposite sides of the line of travel of the beets, the arrangement being such that the blade 50 is presented at an angle to the beet bodies to sever them with a shear cut.

By sharpening the cutting edge of the blade from both sides and making the angle of position of the blade quite acute to the line of travel of the beets, the power required to sever the tops of the beets is lessened and a cleaner cut is obtained than is the case where the cutting blade approaches a position more nearly perpendicular to the line of travel of the beets.

What is claimed is:—

1. A beet harvester comprising means for lifting beets from the ground, means constructed to engage the bodies of the beets and convey them away from the lifting means, traveling means for clamping the bodies of the beets related to the conveying means to grip the beets at a lower portion of their bodies than where engaged by the conveying means, means for severing the tops of the beets from the bodies, and means for engaging the beets to move them in the clamping means all into substantially the same relation to the severing means and movable in the same direction as the means for clamping the bodies of the beets.

2. A beet harvester comprising means for lifting beets bodily from the ground, a carrier for engaging the bodies of the beets and conveying them away from the lifting means each in a substantially upright position, traveling means at the delivery end of and at a lower level than the discharge end of the carrier for receiving and clamping the bodies of the beets individually with the tops uppermost, traveling means in overriding relation to the clamping means for depressing the beets in the clamping means all to substantially the same degree of projection therefrom, and severing means in the path of the beets while in the clamping means for removing the tops of the beets.

3. A beet harvester comprising ground entering and beet lifting means, a carrier composed of adjacent opposed movable members for engaging the bodies of the beets on opposite sides as lifted from the ground, and conveying them toward the rear of the machine, continuously movable opposed clamping members at the delivery end of and at a lower level than the conveyer for receiving and clamping the bodies of the beets with the tops uppermost, means for severing the tops from the beets located in operative relation to the travel of the clamping means, and means in overriding relation to the clamping means for moving the bodies of the beets in the direction of their length in the clamping means to all have substantially the same degree of projection from the clamping means when presented to the severing means.

4. In a beet harvester, means for entering the ground and lifting beets therefrom, opposed endless carriers for the beets moving together to receive the beets between them and convey them toward the rear of the machine, and opposed endless series of yieldable clamping members at the delivery end of and at a lower level than the carrier for receiving and clamping the bodies of the beets.

5. In a beet harvester, means for entering the ground and lifting beets therefrom, opposed endless carriers for the beets moving together to receive the beets between them and convey them toward the rear of the machine, and opposed endless series of yieldable clamping members at the delivery end of and at a lower level than the carrier for receiving and clamping the bodies of the beets, said machine being also provided with a relatively fixed knife, for severing the bodies of the beets, located in operative relation to the clamping means.

6. In a beet harvester, means for entering the ground and lifting beets therefrom, opposed endless carriers for the beets moving together to receive the beets between them and convey them toward the rear of the machine, and opposed endless series of yieldable clamping members at the delivery end of and at a lower level than the carrier for receiving and clamping the bodies of the beets, said machine being also provided with a relatively fixed knife, for severing the bodies of the beets, located in operative relation to the clamping means, and said machine being provided with traveling means in overriding relation to the beets when in the clamping means for moving the bodies of the beets lengthwise in the clamping means to have all substantially the same degree of projection when reaching the severing means.

7. A beet harvester comprising means for entering the ground and lifting beets therefrom, an inclined conveyer comprising two endless chains having synchronously moving runs spaced apart to receive beets between them, and movable clamping members in opposed relation at the discharge end of the conveyer for receiving the bodies of the beets from the conveyer and clamping them, said clamping members having an inclined path of travel substantially parallel with that of the conveyer and having the receiving end at a lower level than the discharge end of said conveyer.

8. A beet harvester having means for lifting the beets from the ground, an inclined conveyer for receiving the beets and comprising two endless chains having closely adjacent spaced runs moving in the same direction with guides for the runs holding them from sagging and separation when engaging the beets, inclined traveling means for clamping the bodies of the beets when discharged from the conveyer, said clamping means being constructed for progressive movement while clamping the beets, and said clamping means having its path of travel substantially parallel with that of the conveyer with its receiving end at a lower level than the discharge end of the conveyer, and means in the path of the beets carried by the clamping means for severing the tops of the beets.

9. A beet harvester having means for lifting the beets from the ground, a conveyer for receiving the beets and comprising two endless chains having closely adjacent spaced runs moving in the same direction with guides for the runs holding them from sagging and separation when engaging the beets, means for clamping the bodies of the beets as discharged from the conveyer, said clamping means where receiving the beets being located at a lower level than the discharge end of the conveyer and being constructed for progressive movement while clamping the beets, and means in the path of the beets carried by the clamping means for severing the tops of the beets, the machine being also provided with means in overriding relation to the movable clamping means for forcing the beets carried thereby all into substantially the same relation to the severing means.

10. In a beet harvester, means for lifting beets from the ground, means for conveying beets from the lifting means toward the rear of the machine, and means at the discharge end of the conveyer for receiving and clamping the beets, said means comprising endless series of elastic clamping heads arranged to provide adjacent runs moving in the same direction.

11. In a beet harvester, means for lifting beets from the ground, means for conveying beets from the lifting means toward the rear of the machine, and means at the discharge end of the conveyer for receiving and clamping the beets, said means comprising endless series of elastic clamping heads arranged to provide adjacent runs moving in the same direction, the clamping heads having associated therewith a severing knife in position to remove portions of the beets projecting above the clamping means.

12. In a beet harvester, means for lifting beets from the ground, means for conveying beets from the lifting means toward the rear of the machine, and means at the discharge end of the conveyer for receiving and clamping the beets, said means comprising endless series of elastic clamping heads arranged to provide adjacent runs moving in the same direction, the clamping heads having associated therewith a fixed severing knife in position to remove portions of the beets projecting above the traveling clamping means and also having associated therewith an engaging member in overlying relation to the clamping means for regulating the projection of the beet bodies above the clamping means.

13. In a beet harvester, means for lifting beets from the ground, means for conveying beets from the lifting means toward the rear of the machine, and means at the discharge end of the conveyer for receiving and clamping the beets, said means comprising endless series of elastic clamping heads arranged to provide adjacent runs moving in the same direction, the clamping heads having associated therewith a severing knife in position to remove portions of the beets projecting above the clamping means, and also having associated therewith an engaging member in overlying relation to the clamping means for regulating the projection of the beet bodies above the clamping means, said engaging member comprising a plate arranged in the path of the beets, and an endless web between the plate and the beets and there movable in the direction of travel of the beets.

14. A beet harvester comprising a vehicle having supporting wheels, driving means driven by the supporting wheels, ground entering means at the front end of the vehicle shaped to lift beets from the ground, a lifting conveyer for the beets constructed to hold them in a substantially upright position and provided with connections with the driving means of the vehicle, a clamping conveyer for the beets having the receiving end in underriding relation to the discharge end of the elevating conveyer, the clamping conveyer being in substantially parallelism with the lifting conveyer, and also having driving connections with the driving members of the vehicle, severing means for the tops of the beets in operative relation to the clamping means, and beet depressing means in overriding relation to the clamping means, the depressing means being provided with an endless belt to engage the beets, and said belt having driving connections with the driving mechanism of the vehicle to cause it to travel in the same direction as the clamping means.

In testimony that I claim the foregoing as my own, I have hereto affixed my signature in the presence of two witnesses.

JUSTUS A. BROWNING.

Witnesses:
JOHN E. BAGLEY,
NELLIE McWHINNEY.